United States Patent [19]

You

[11] Patent Number: 4,699,289
[45] Date of Patent: Oct. 13, 1987

[54] STRUCTURE OF SWITCH BOX

[76] Inventor: San Far You, 3 FL., 69, Lane 241, Jen Yi St., San Chung, Taiwan

[21] Appl. No.: 845,967
[22] Filed: Mar. 31, 1986
[51] Int. Cl.$^4$ ............................................. H02G 3/08
[52] U.S. Cl. .................................... 220/3.7; 220/3.8; 220/3.9
[58] Field of Search ................... 220/3.7, 3.2, 3.3, 3.8, 220/3.92, 3.94, 3.9

[56] References Cited

U.S. PATENT DOCUMENTS

| | | | |
|---|---|---|---|
| 1,066,805 | 7/1913 | Fisher | 220/3.7 |
| 2,612,283 | 9/1952 | Cole | 220/3.8 X |
| 2,878,955 | 3/1959 | Hagan | 220/3.9 |
| 3,499,570 | 3/1970 | Butler | 220/3.3 |
| 3,618,804 | 11/1971 | Krause | 220/3.8 X |
| 3,654,663 | 4/1972 | Algotsson | 220/3.8 X |
| 3,846,604 | 11/1974 | Shallbetter | 220/3.3 X |
| 4,131,932 | 12/1978 | Brumfield, Jr. et al. | 220/3.8 X |

Primary Examiner—Steven M. Pollard
Attorney, Agent, or Firm—Holman & Stern

[57] ABSTRACT

The present invention relates to an improved structure of switch box and particularly to a structure composed of such members as a box body, an assembly plate, a sleeving frame and a panel, wherein the box body will not be deformed in the process of grouting so that the panel can be easily installed on the box body and adjustable in line with the position of building wall surface, the panel and the building wall surface are on the same one plane, and the purposes of convenience, safety and practicability can be achieved.

1 Claim, 6 Drawing Figures

FIG·3

STRUCTURE OF SWITCH BOX

BACKGROUND OF THE INVENTION

Each building is in need of a switch box so as to achieve the purposes of safety on the one hand and enhancing beauty in keeping with the building on the other hand. Therefore, the switch box is a prerequisite necessity of building material. The conventional switch box may be divided into types, namely, exposed and embedded, for the optional choice by the contractors, but these two types cannot be replaced with each other and the embedded type has the following drawbacks:

1. Those portions around the screw holes on the conventional structure which are exposed tend to be blocked by cement during grouting which deforms the switch box. After the building structure is finished, the screw holes on the box panel can not be correctly aligned with the screw hole on the box body, leading to an inconvenient assembly.

2. The fixed conventional box body and panel structure cannot be in keeping with a wall surface which has been painted or tiled, in other words, the panel surface and the wall surface are not on the same one plane, so the beauty of wall surface is spoilt.

3. The conventional structure is not provided with any covering plate, so the binding terminal is exposed. In case of closing the box door, a rat may gnaw and break the electric wire insulation and die of electric shock when it contacts the said wire which will lead to burning. In addition, when opening the said door, the operator may also contact the electric wire, so its safety is very poor.

An object of this invention is to offer an improved structure of switch box which will not be deformed during grouting and can achieve the purpose of convenient practice when assembling the panel.

Another object of this invention is to offer an improved structure of switch box with a position adjustable panel so that the panel surface and the wall surface are on the same plane to enhance the beauty and practicability of these surfaces. Still another object of this invention is to offer an improved structure of switch box with a high-degree of safety.

SUMMARY OF THE INVENTION

The present invention relates to an improved structure of switch box wherein the assembly plate is fixed on the bolt on the inner wall of box body with the nut; the sleeving frame is fixed on the L-rack of assembly plate with the screw; and the panel is screwed together with the frame plate of frame body and the side plate of sleeving frame, so that the panel and the box body are assembled with each other to aviod the box body from being deformed or the screw hole from being block during grouting which will cause the impossible alignment with the screw holes on the panel, the inconvenient installation and assembly, the panel and the wall surface not on the same one plane, and the prohibitive spoilage of appearance and beauty, but the special purposes of convenience, practicability, safety and beauty can be achieved.

DETAILED DESCRIPTION OF THE PREFERRED EMBODIMENT

Figure 1:
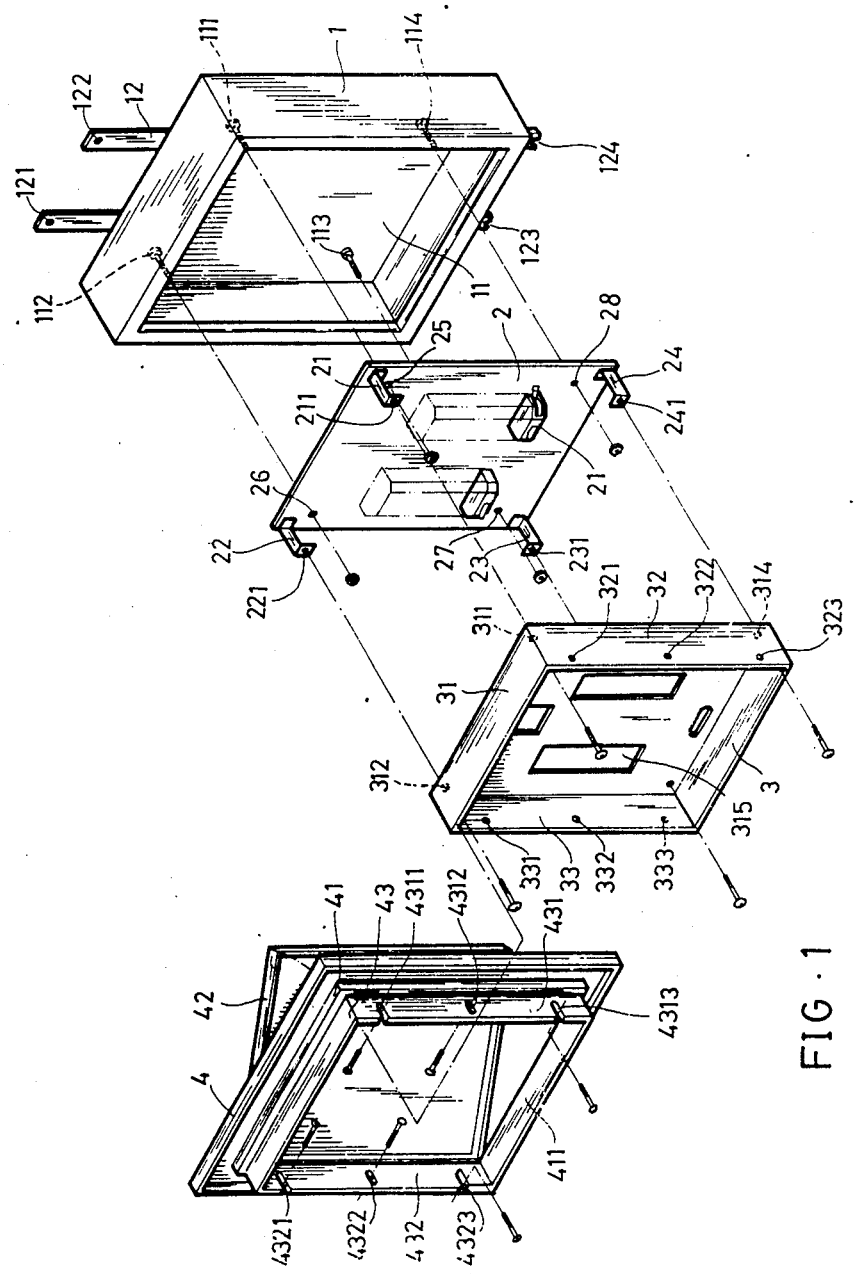
FIG. 1 is an exploded perspective view of components of this invention.
Figure 2:
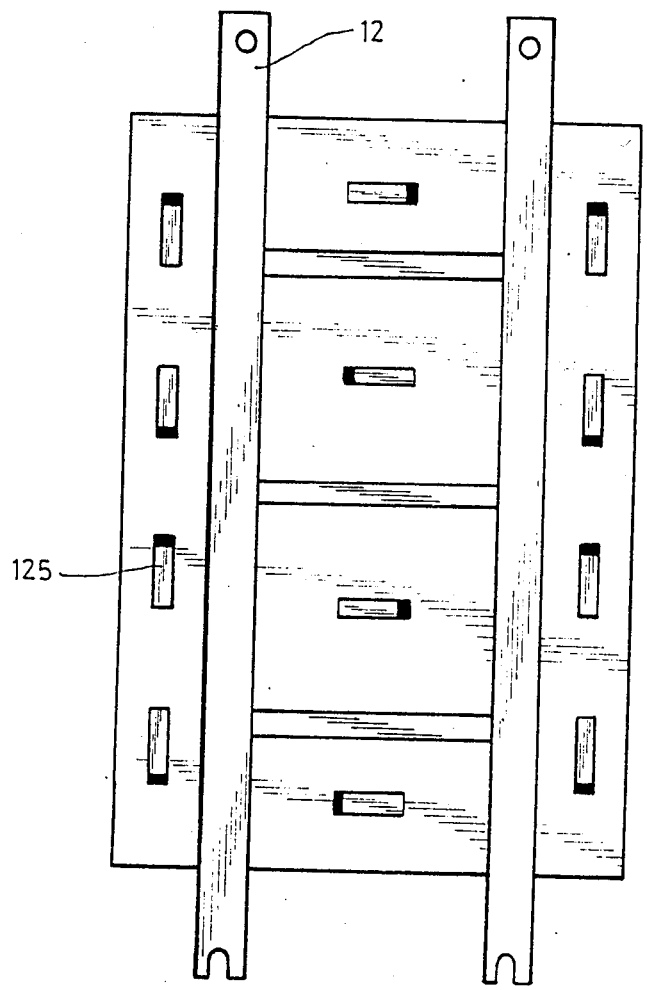
FIG. 2 is a rear elevational view of the box body of this invention.
Figure 3:
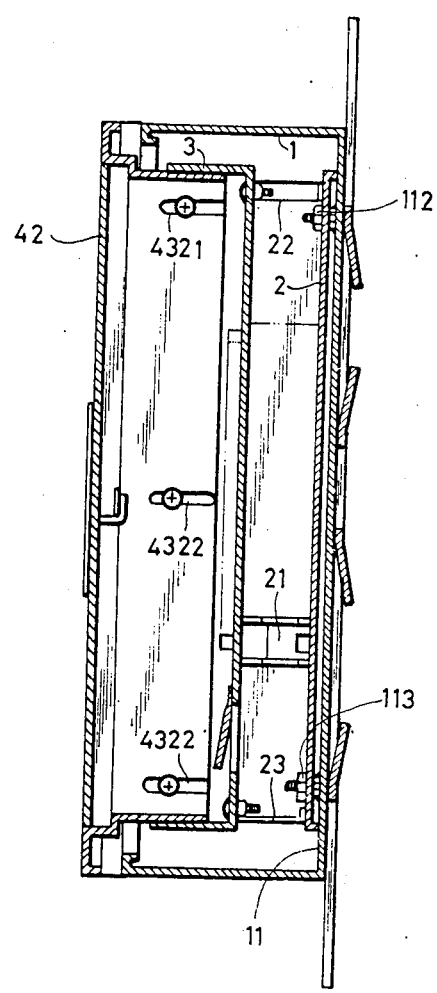
FIG. 3 is a section view of this invention.

As shown in FIGS. 1 to 3, a bolt (111),(112),(113),(114) is in each corner on the front of inner wall (11) of box body (1), a catch (125) and a ladder-shaped H-frame (12) are on the back thereof; a hole (121), (122) is at each upper end of H-frame (12), a recess (123), (124) is at the lower end thereof; an L-rack or bracket (21),(22), (23),(24) is to align with the hole (311),(312),(313),(314) on the frame plate (31) of sleeving or mounting frame (3), a hole (25),(26),(27), (28) is nearby the L-rack (21),(22),(23),(24) to align with the bolt (111),(112),(113),(114) on the inner wall (11) of box body (1); a hole (331),(312),(313),(314) is in each corner on the frame plate (31) of sleeving frame (3), a slot (315) is on the frame plate (31) in keeping with the position of switch seat on the assembly plate (2), three holes (321),(322),(323);(331),(332),(333) are respectively around the front edge of two side plates (32),(33) to align with the slots (4321),(4322),(4333),(4311),(4312),(4313) on the frame plates (431),(432) of frame body (43) of panel (4); a door frame (41) on the panel (4) is to receive the door plate (42) which is to be inserted in the groove (411), a frame body (43) is extended from the door frame (41) to be just placed in the sleeving frame (3), and these two frame plates (431),(432) have the slots (4311),(4312),(4313);(4321),(4322),(4323) respectively.

When assembling the box, sleeve the holes (25), (26),(27),(28) on the assembly plate (2) onto the bolts (111),(112),(113),(114) on the inner wall (11) of box body (1) so as to fix the assembly plate (2) onto the inner wall (11) of box body (1) through screwing the nuts, then align with the screw holes (211),(221),(231), (241) on the L-racks (21),(22),(23),(24) of assembly plate (2) so as to lock the assembly plate (2) and the sleeving frame (3) together with screws; the switch seat on the assembly plate (2) is exposed through the slot (315), the binding terminal is hidden behind the frame plate (31) to enhance the safety; then to insert the frame body (43) of panel (4) in the sleeving frame (3) so as to align the slots (4311),(4312),(4313);(4321),(4322),(4323) on these two frame plates (431),(432) with the holes (331),(332), (333);(321),(322),(323) on the side plates (32),(33) of sleeving frame (3) respectively and to lock the panel (4) and the sleeving frame (3) together through screws, an integral structure of this invention is well assembled.

Figure 4:
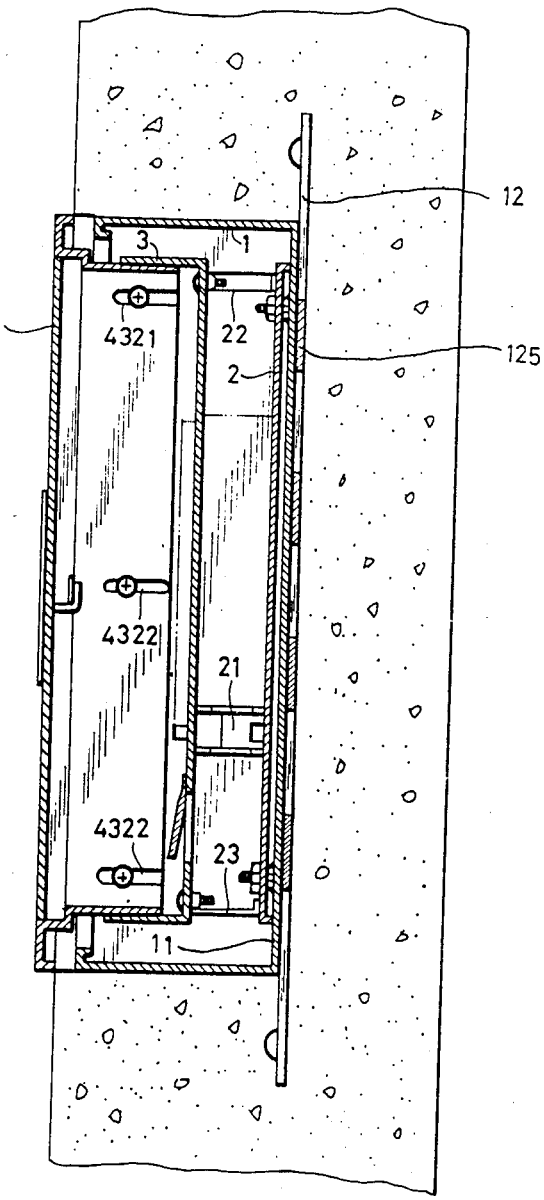
FIG. 4 is a sectional view of an assembled box embedded in a wall.
Figure 5:
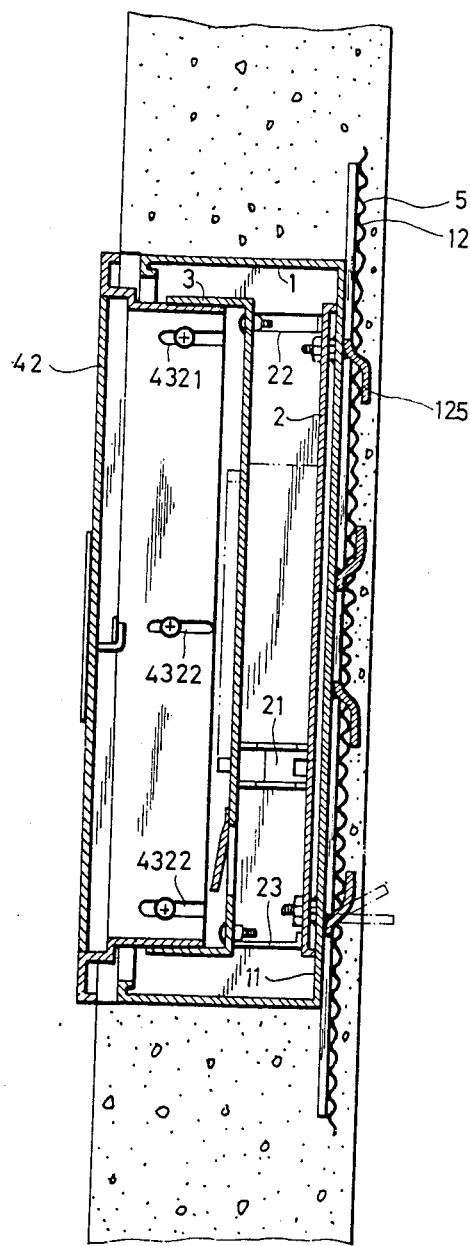
FIG. 5 is a view similar to FIG. 4 showing a modification.

When in use, provided it is an embedded type, as shown in FIG. 4 to place the box body (1) in the predetermined position on the unfinished building structure, to tightly tie the H-frame (12) onto the steel bar to be fixed by grouting. If the thickness of wall wherein this invention is to be embedded is too thin, a wire netting (5) can be fixed onto the back of box body (1) through the catch (125) so as to step up the adhesive force of cement as shown in FIG. 5. Since the bolts (111),(112),(113),(114) are on the inner wall (11) of box body (1), the cement during grouting will not splash onto them, and the H-frame (12) preset behind the inner wall (11) can enhance the structural strength of inner wall (11) which will not be deformed. After the building structure is finished, the integral structure of this invention is to be completed in line with the foregoing process wherein if the wall surface of building is thicker because of painting or tiling, the screws of various slots (4311),(4312),(4313);(4321),(4322),(4323) and holes (331), (332),(333);(321),(322),(323) may be loosened so as to pull out the frame body (43) for adjustment until the surfaces of both the panel (4) and the building wall are on the same one plane, then to screw back the screws thereof.

Figure 6:
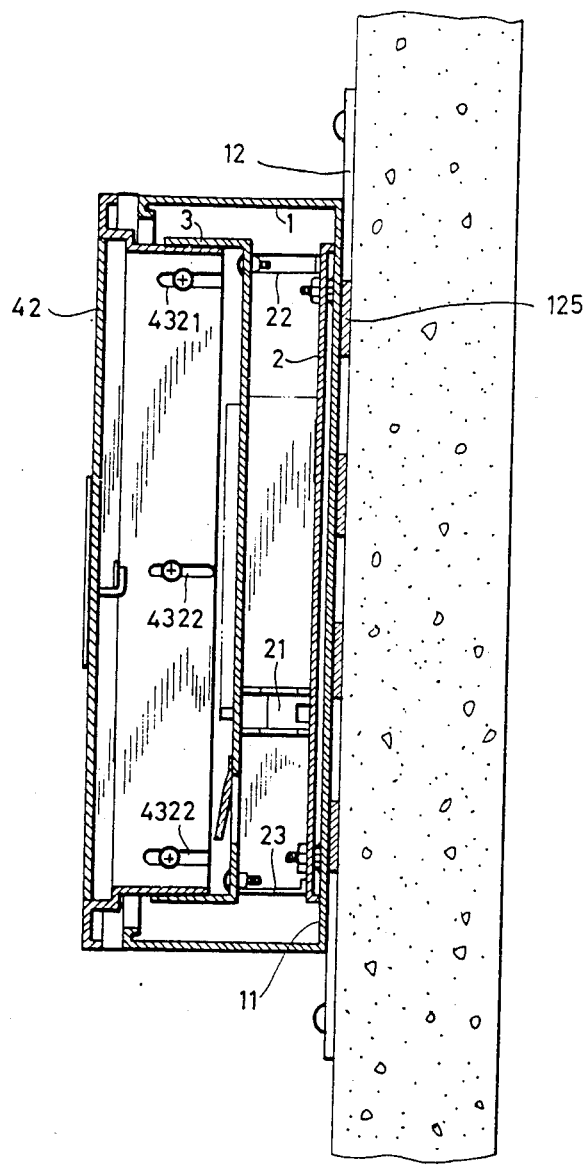
FIG. 6 is a view similar to FIG. 4 showing a surface-mounted box.

If this invention is to be used as an exposed type, as shown in FIG. 6, all to do is to hang the two recesses (123), (124) on the H-frame (12) of box body (1) onto two screws fixed on the predetermined position of installing the switch box on the building structure, the box body (1) is fixed onto the building wall with two screws passing through the holes (121),(122), then the integral structure of this invention can be finished in line with the foregoing process.

I claim:

1. A switch box structure comprising a box body having a rear wall and side walls, first screws extending from an inner surface of the rear wall for attachment of an assembly plate within the box body, a ladder-shaped frame on an outer surface of the rear wall, the frame having limbs protruding from opposite ends of the box body with attachment means for securing the structure on a wall or the like, protruding catches on the outer surface of the rear wall, an assembly plate for receipt in the box body, the assembly plate having apertures for receipt on the first screws, mounting means on the assembly plate for a switch, projecting brackets on the assembly plate for attachment of a mounting frame, a mounting frame for attachment to said brackets, the mounting frame having a base wall with a cutout aligned with said mounting means and side walls projecting from the base wall with screw apertures in the side walls, a door panel comprising a door frame with a swing door and side walls projecting rearwardly from the door frame for receipt within the side walls of the mounting frame, the side walls of the door frame having slots aligned with said screw apertures, and second screws for receipt in said screw apertures and slots whereby the door panel can be adjustably secured to the mounting frame dependent on the positioning of the second screws along the slots.

* * * * *